Nov. 17, 1959     S. PAULL     2,913,708
MAGNETIC CORE NONDESTRUCTIVE READOUT CIRCUIT
Filed July 18, 1957
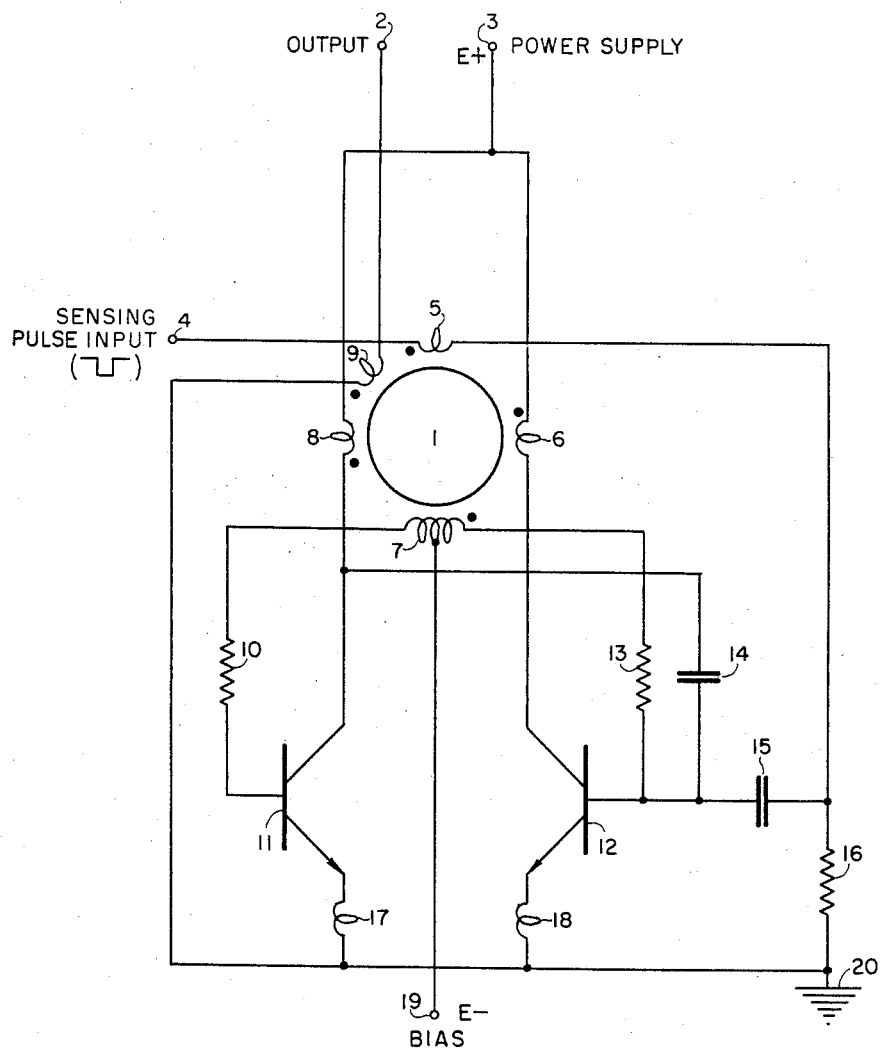
INVENTOR
STEPHEN PAULL
BY *Richard C. Reed*
ATTORNEYS

United States Patent Office 2,913,708
Patented Nov. 17, 1959

2,913,708

MAGNETIC CORE NONDESTRUCTIVE READOUT CIRCUIT

Stephen Paull, Falls Church, Va.

Application July 18, 1957, Serial No. 672,844

6 Claims. (Cl. 340—174)

(Granted under Title 35, U.S. Code (1952), sec. 266)

The invention described herein may be manufactured and used by or for the Government of the United States of America for governmental purposes without the payment of royalties thereon or therefor.

This invention relates to electronic circuits using binary storage elements in general, and more particularly to a non-destruction readout circuit.

In an electronic circuit such as a counter circuit which includes a magnetic core, it is desirable to know which of the two possible states of remanence exists in the magnetic core. The flux alignment in a magnetic core stabilizes in either of two different states called remanence. Positive remanence is known as condition or state "one" and negative remanence is known as condition or state "zero."

Prior sensing circuits have destroyed the state of remanence of a core in order to determine the original state of remanence. Also, the sensing pulses of the prior circuits have furnished the energy to reverse the flux alignment of the core.

It is therefore an object of this invention to provide a nondestructive readout circuit.

It is another object of this invention to provide a read-out circuit which maintains the state of remanence of a core if saturated in one of the two possible states and which restores the original state of remanence of the core if it is in the other possible state.

Another object of this invention is to provide a read-out circuit which does not draw power for switching the flux alignment in the core from the readout pulse.

Still another object of this invention is to provide a magnetic core circuit wherein unilateral sensing pulses cause either monostable flip-flop action or no action depending on core condition.

The exact nature of this invention as well as other objects and advantages thereof will be readily apparent from consideration of the following specification relating to the annexed drawing in which the figure is a schematic diagram of the nondestructive readout circuit of the present invention.

The circuit of this invention senses the direction of flux alignment of a "square-loop" magnetic core element.

In the drawing, core 1 is of tape wound magnetic material or of ferrites, or the like.

The operation of the sensing circuit is described by first assuming that core 1 is in condition "zero." A negative sensing pulse is applied at input 4 to enter core winding 5 at the dotted end thereof.

By convention, positive potential at the dotted end of a core winding produces positive flux alignment, that is, changes the flux alignment in the core in the direction from "zero" toward "one." Likewise, a negative potential at the not dotted end of a core winding produces positive flux alignment in the core.

The negative sensing pulse applied at input 4 provides a negative voltage drop across resistor 16.

Such negative sensing pulse and the induced voltage on control winding 7 through resistor 13 produce a net negative voltage on the base of n-p-n transistor switch 12. Since transistor switch 12 is an n-p-n type, the net negative potential applied to its base will maintain said switch in open condition.

However, the sensing pulse induces on magnetic core 1 a change of flux alignment which, in turn, induces a positive potential at the not dotted end of control winding 7. Such potential applied to the base of transistor switch 11 closes switch 11 to afford the passage of current from the power supply 3 through flux changing winding 8, transistor 11 and choke 17 to ground 20. The current through switch winding 8 changes the core flux alignment from "zero," negative remanence, to positive saturation.

The net negative voltage on the base of transistor switch 12 maintains switch 12 open during the change of flux alignment in the core. Such net negative voltage is provided by the combination of the negative bias 19 and the negative potential acrosss resistor 13 which is induced on the dotted end of control winding 7. Upon the closing of transistor switch 11 in the flux changing circuit, the potential at the junction of transistor 11 and capacitor 14 drops from the level of E positive power supply potential. Such drop provides a negative pulse across capacitor 14 to add to the net negative potential on the base of transistor 12. During the change of flux from "zero" to positive saturation, any positive potential across resistor 16 is coupled to transistor 12 through capacitor 15 but is insufficient to overcome the net negative voltage set forth above.

During such change of core flux condition a positive output pulse at output 2 from winding 9 indicates that the condition of core 1 was "zero" at the time of application of the sensing pulse.

When core 1 reaches positive saturation, transistor switch 11 opens since no potential drop is then induced across the core windings, including control winding 7.

Therefore, the negative bias 19 predominates to open transistor switch 11. The saturation of core 1 is not retained upon the removal of the power supply, and the flux alignment drops from saturation to condition "one," positive remanence. When transistor 11 cuts off, the collector of transistor 11 returns to positive E potential and the positive pulse at the dotted end of switch winding 8 is applied through capacitor 14 to the base of reset transistor switch 12. This closes switch 12 and causes current to flow from power supply 3 through reset winding 6, transistor switch 12 and choke 18 to ground. The current flow in reset winding 6 is such that the flux alignment of core 1 is changed from "one" toward negative saturation. The potential induced thereby across control winding 7 is negative at the not dotted end of control winding 7 and is positive at the dotted end thereof. The positive potential applied to the base of n-p-n transistor switch 12 from winding 7 through resistor 13 maintains switch 12 closed until negative saturation of the core 1 is reached.

At saturation, no potential is induced on any of the windings on core 1. Once more the negative bias 19 predominates and switch 12 is opened. Current ceases to flow through reset winding 6 and the flux alignment of core 1 drops from negative saturation to "zero," negative remanence. The positive potential that is induced at the not dotted end of control winding 7 is not of sufficient magnitude to close switch 11 because of the effectiveness of resistance 10 combined with the negative bias 19 and the inductances 17 and 18.

The values of the inductances of chokes 17 and 18 are selected so as to provide a retardation of the fall of flux concentration from negative saturation to "zero," negative remanence, which is sufficient to assure that the voltage induced across control winding 7 by such fall is below the threshold of operation of the closing of switch 11. Free oscillation of the circuit is thereby precluded.

Core 1 is once more in condition "zero," the condition which existed before the sensing pulse was applied. The positive output obtained at output 2 during the change from "zero" to positive saturation indicates that the condition of the core was "zero" before the readout, sensing pulse was applied. It will be seen that the absence of a positive pulse at output 2 after a sensing pulse is applied indicates that the condition of the core was "one" before the sensing pulse was applied.

It is now assumed that the condition of core 1 is "one." A negative trigger sensing pulse applied at input 4 through winding 5 induces a positive potential on the not dotted end of all windings on core 1. During the negative rise time of sensing pulse at input 4, transistor switch 11 is closed by the positive potential induced on the not dotted end of control winding 7. Transistor switch 12 is maintained in open condition by the negative potential on the dotted end of control winding 7. During the flat portion of the sensing pulse as shown at 4 in the drawing, no potential is induced on control winding 7 and transistor 11 stops conducting. The resulting positive pulse through capacitor 14 due to transistor 11 collector potential rise is exceeded by the negative voltage across resistor 16 and the net voltage on transistor 12 base is negative. Transistor 12, therefore, remains open. When the flux alignment of core 1 drops from positive saturation to "one," positive remanence, the positive potential that is induced at the not dotted end of control winding 7 is not of sufficient magnitude to close transistor switch 12 because of the effectiveness of resistance 13 combined with the negative bias 19 and the inductances 17 and 18. Since transistor switch 11 is closed only during the change from "one," positive remanence, to positive saturation, and transistor switch 12 remains open during the entire sensing operation when the core is initially in "one" condition, the core remains in the "one" condition. Since the flux alignment of the core is not altered by the sensing operation, no significant output is realized at output 2.

It is now seen that the presence of a positive pulse at output 2 indicates the presence of "zero" condition of core 1 and that the absence of such positive pulse indicates the presence of "one" condition of the core 1.

It is seen that the sensing pulse does not provide the energy required to switch the flux saturation of the core. Also, no energy is required to maintain the magnetic core in either state of remanence and the circuit provides for use of the power supply only during switching of the cores from one state of remanence to another.

The sensing pulse alone triggers the sensing operation. The maximum magnitude required of the sensing pulse need not exceed that which is sufficient to switch the transistor switches.

It is seen that I have provided an efficient magnetic core nondestructive readout circuit.

It is obvious that the polarities set forth in this disclosure can be reversed within the breadth of this invention.

Obviously many modifications and variations of the present invention are possible in the light of the above teachings. It is therefore to be understood that within the scope of the appended claims the invention may be practiced otherwise than as specifically described.

What is claimed is:

1. A nondestructive readout circuit for a binary means capable of being stabilized in either of two stable states and including state switching and reset means comprising, means for applying a readout pulse to said switching means for switching said binary means only when said binary means is in a predetermined one of its stable states, means for coupling said binary means to said resetting means for resetting said binary means to its predetermined stable state, when said binary means is switched by said switching means, means producing an output pulse when said binary means is switched.

2. In a sensing circuit, binary means capable of being stabilized in either of two states, means for applying an input signal to said binary means, means for changing the state of said binary means, means for resetting the state of said binary means, control means coupled to said binary means and connected to said means for changing the state of said binary means and to said means for resetting the state of said binary means, said control means being responsive to the state of said binary means and to a characteristic of said input signal to cause the means for changing the state of said binary means to operate when the binary means is in one of said states, and to cause the means for changing the state of said binary means to be inoperative when the state of said binary means is in the other of said states, and said control means including means for causing the means for resetting the state of said binary means to operate upon the completion of the operation of the means for changing the state of said binary means.

3. The sensing circuit set forth in claim 2 including means for terminating the operation of all of the above said means upon the completion of the resetting of the state of said binary means.

4. In a sensing circuit, binary means capable of being stabilized in either of two states, means for applying an input signal to said binary means, first resistance means, common return means, means for connecting said first resistance means between said means for applying an input signal and said common return, means for changing the state of said binary means coupled thereto, means responsive to the state of said binary means to operate said means for changing the state of said binary means when the binary means is in one of said two states, and means responsive to the other of said two states for said binary means to effect inoperativeness of said means for changing the state of said binary means.

5. In a sensing circuit, binary means capable of being stabilized in either of two states, means for applying an input signal to said binary means, first resistance means, common return means, means for connecting said first resistance means between said means for applying an input signal and said common return, means for changing the state of said binary means coupled thereto, means responsive to the state of said binary means to operate said means for changing the state of said binary means when the binary means is in one of said two states, means responsive to the other of said two states for said binary means to effect inoperativeness of said means for changing the state of said binary means, and means to reset the state of stability of said binary means following the operation of said state changing means.

6. In a sensing circuit, a magnetic core, a first resistance means, an input winding coupled to said core, a common return, means for connecting said first resistance means between the said input winding and said common return, input means connected to the said input winding, a flux changing winding coupled to said core, a first transistor having a collector, a base and an emitter, a power source, means for connecting the said flux changing winding between said power source and the collector of said first transistor, a first impedance means, means for connecting said first impedance means between the emitter of said first transistor and said common return, a reset winding coupled to said core, a second transistor having a collector, a base and an emitter, means for connecting said reset winding between said power source and the collector of said second transistor, a second impedance means, means for connecting said second impedance means between the emitter of said second transistor and said common return, a control winding coupled to said core, a second resistance means, means for connecting said second resistance means between said control winding and the base of said first transistor, a third resistance means, means for connecting said third resistance means between said control winding and the base of said second transistor, a first capacitance means, means for connecting said first capacitance means between the collector of the first transistor and the base of the second transistor, a second capacitance means, means for connecting said second capacitance means between said first resistance and the base of said second transistor, a negative bias source, means for connecting said negative bias source to said control winding, and an output circuit coupled to said core.

References Cited in the file of this patent

UNITED STATES PATENTS 2,764,677     Graham ---------------- Sept. 25, 1956